United States Patent Office 3,708,442
Patented Jan. 2, 1973

3,708,442
PROCESS FOR PREPARING FOAM MATERIALS RESISTANT TO PRESSURE AND HEAT FROM MIXTURES OF BITUMINOUS MASSES AND PHENOLIC RESINS
Heinz-Gerhard Franck and Walter Metzendorf, Duisburg-Meiderich, and Johannes Turowski, deceased, late of Castrop-Rauxel, Germany, by Else Paula Maria Turowski, nee Hinz, heir, and Jaafar Omran, Nijssen, and H. G. Jozef, Castrop-Rauxel, Germany, assignors to Rutgerswerke Aktiengesellschaft, Frankfurt am Main, Germany
No Drawing. Filed May 5, 1970, Ser. No. 34,879
Int. Cl. C08j 1/14
U.S. Cl. 260—2.5 F      7 Claims

ABSTRACT OF THE DISCLOSURE

Foam materials resistant to pressure and heat are prepared from mixtures of bituminous masses and phenolic resins by condensation of a mixture of bituminous masses, phenols and hexamethylenetetramine in the presence of an alkaline catalyst at a reaction temperature in the range of 140 to 200° C. for about 4 hours and foaming and hardening the resulting mixture consisting of bituminous masses and phenol-formaldehyde resins by incorporating therein hexamethylene-tetramine.

---

In the industry, solid foams—i.e. materials of a cellular structure and of low bulk density are needed for insulation from heat and cold, as well as for acoustic screening are needed in increasing amounts. The properties required from such foam materials are variable and depend on the intended use. In general, high insulating power, good mechanical stability, high resistance to pressure, high resistance to changes of shape, low absorption of steam and low permeability to vapors, are required in the foam materials.

The commercial foam materials of low bulk weight are in general prepared up to date from artificial resins, such as polystyrene, polyurethane, epoxide resins, silicones and phenolic resins. Some of them have certain excellent properties, but they are, of course, relatively expensive. The foam materials of this group, which are less expensive, the thermal stability and the mechanical resistance are not satisfactory.

Foam materials prepared from bituminous masses, e.g. coal tar pitch or bitumen, have not been found satisfactory. Owing to the plastic properties of these raw materials, they are not of sufficient stability of shape, above a certain temperature and, in general, they are relatively brittle.

It has been previously suggested by applicants to prepare foam materials from mixtures of bituminous masses and novolaks at temperatures in the range of 150 to 210° C., a viscosity of 50 to 5000 cp. and in the absence of free acid, by foaming and simultaneous hardening. According to this suggestion foam materials can be obtained, which are of stability of shape, resistant to pressure, and resistant to heat and chemicals, at a favorable price. It is, however, a disadvantage of this process that in order to observe the conditions of the foaming and hardening process—viscosity of 50 to 5000 cp. at 150 to 210° C. and absence of free acid—either tar bases having a boiling range of 160 to 190° C. must be added to the mixture of bituminous masses with novolak, or, without such addition, said mixture must be subjected to a thermal pretreatment at 280 to 350° C., or subjected to a pretreatment at 150 to 160° C. with the addition of 0.2 to 0.3 part of hexamethylene-tetramine to 100 parts of said mixture.

The main object of the present invention is the preparation of foam materials which can be produced at a favorable price, are resistant to pressure, heat and chemicals, from bituminous masses and phenol resins without the burdening necessity of using additional chemicals or a thermal pretreatment of the mixture to be foamed.

According to the present invention this object is attained by proceeding as follows:

A mixture of bituminous masses, phenols and hexamethylenetetramine, is subjected in the presence of an alkaline catalyst, e.g. solid NaOH, to a condensation reaction at 140 to 200° C. for about 4 hours. The resulting mixture of bituminous masses with phenol-formaldehyde resins is foamed and hardened with the addition of a propellant—preferably hexamethylenetetramine—in a pressure vessel.

This procedure of the present invention has the further advantage that the necessary phenolic resins are not used in the form of the relatively expensive ready novolaks, but are formed in the course of the present process by condensation, eventually from inexpensive starting materials, such as for example from phenol fractions which are less suitable for other purposes.

According to a preferred embodiment, the process of the invention is conducted in such manner that the condensation reaction is carried out first in presence of a part only of the intended amount of the bituminous mass—preferably in the presence of 20–65% of bituminous mass, calculated on the weight of phenols—and subsequently adding the rest of the bituminous mass to the condensation product and finally foaming and hardening the total mixture. By using this procedure, the compression strength of the resulting foam material is clearly increased.

It has been known from the French Pat. No. 867,705 to improve tars, particularly for the use in coatings, by reaction with an aldehyde, particularly formaldehyde, or with hexamethylene tetramine, the phenols present therein—if desired after enrichment with added phenols—in the presence of acid or alkaline catalysts—to phenolic resins. But the French patent discloses or suggests nothing about the formation of valuable foam materials by foaming tar-phenolic resin-mixtures by means of propellants and hardening the foams.

The foaming and hardening process according to the present invention is preferably carried out by temperatures of 165 to 180° C.

Bituminous masses used according to the invention are: natural asphalt, petroleum bitumens, or preferably coal tars, lignite tars, or wood tars. Coal tar pitches, lignite tar pitches, wood pitches, petroleum bitumen rich in aromatics or mixtures of these bituminous masses are particularly preferred and used in amounts of 50 to 70%, preferably 55 to 65%, calculated on the mixture of the bituminous mass with phenols. According to the invention pitches having a softening point according to Kramer-Sarnow of 30 to 120° C., preferably coal tar pitches having a softening point of 60–80° C. are used.

Phenols which are charged in the condensation stage of the invention are: pure phenol ($C_6H_5OH$), and/or cresols, and/or xylenols in pure or technical quality.

The mixtures to be foamed can be modified by the addition of filling materials, such as talcum, asbestos, soot, or the like, or with polyethylene, polyvinylchloride, polystyrene, or similar materials.

It has been found that in the process of the invention foam materials distinguished by good isolating characteristics, good mechanical resistance, as well as extraordinarily high stability at high temperatures up to above 300° C. and good chemical stability are obtained. The foam material prepared according to the invention is not inflammable.

In the expansion without pressure, according to the invention foam materials having largely open pores are obtained, while proceeding under pressure, i.e. in a closed vessel, the foamed materials have preponderantly closed pores.

The preparation of solid foam materials from mixtures of bituminous masses and thermoplastic synthetic resins has been known from the French Pat. 1,065,257. However, the foam materials prepared according to this patent are naturally of very limited resistance to heat. This French patent also contains a short hint (see page 2, right column, lines 2-3) that instead of the thermoplastic synthetic resins, heat-hardenable synthetic resins may also be used. However, in comparison with the simple procedure of the present invention, this process of the French patent is rather troublesome and extraordinarily protracted.

According to the French Pat. 1,065,257, the bituminous masses and—if necessary—the resin are ground and mixed in solid condition, after addition of a plasticizing agent and of a foaming agent, to form a paste. The paste is poured into molds and is converted by heat treatment under pressure and subsequent cooling into a product which, due to its plasticity at higher temperature, can be caused to expand by slow and careful heating during an extended period of time. The gas liberated from the foamer during heating causes slow expansion of the softening mass. The foaming process is extraordinarily protracted and requires several days.

In contrast to the French patent, mixing of the bituminous mass, phenols and hexamethylenetetramine takes place in the liquid phase. Mixing is followed by condensation in the heat during about 4 hours. The subsequent foaming takes place parallel with the hardening, so that after termination of the expansion process a product is at hand, the chemical and physical properties of which are entirely different from those present before said process. Surprisingly, these different properties are much more favorable than those which could be expected by a person skilled in the art in a combination of the components of the mixture—in view of the known characteristics of phenol resin foam and foam materials from bituminous masses. In the periodical "Product Engineering" of June 21, 1965, pp. 59–68("How to Evaluate the Rigid Plastic Foams" by H. Gerstin), on page 60 (middle column, lines 2 to 6) the extreme brittleness, the low resistance to pressure and the tendency of phenol resin foams to corrode metals, is described. Therefore, even if French Pat. 1,065,-257 contains a vague hint to produce foam material from bituminous masses and heat-hardenable resins, the article in Product Engineering indicates that a person skilled in the art not only could not consider the use of a phenolic resin as a heat-hardenable resin, but had to conclude that these phenolic resins are clearly unsuitable for this purpose.

The fact that foam materials prepared from bituminous masses have not been found satisfactory has already been mentioned above.

Foam materials prepared according to the present invention show not the slightest brittleness; they are resistant to pressure and do not corrode metals because they do not contain any free acid. The fact that the foam materials embodying the invention are not inferior at all with regard to the heat resistance of phenol resin foam, is surprising, because it is known that foam materials prepared from bituminous masses have an extremely low resistance to heat.

The decisive advantages of the present invention are particularly: the chemical change of properties of the mixture to be foamed, of the bituminous mass and phenolic resin; the expansion process which is very simple and requires little time only (i.e. a few minutes).

The following examples describe some preferred embodiments of the invention, to which the invention is not limited.

The parts and percent stated herein are by weight if not otherwise stated.

EXAMPLE 1

100 parts of coal tar pitch (softening point 80° C. KS) and 80 parts of phenol (softening point 40° C. KS) are melted in an open receptacle and are thoroughly mixed with a mechanical stirrer. To this mixture 9.6 parts of hexamethylenetetramine and 1.6 parts of solid NaOH are added. The mixture is then heated to about 140° C. under continued stirring. The temperature rises to about 160° C., due to exothermic reaction. After fading of the exothermic reaction the mixture is further heated to 180° C., then allowed to cool to 170° C. and then foamed in a pressure vessel with 6% hexamethylenetetramine.

The resulting pitch foam has the following characteristics:

Bulk weight _____ 190 kg./m.$^3$.
Resistance to pressure _____ 10 kg./cm.$^2$ (compression strength).
Pores _____ Fine and uniform.

EXAMPLE 2

100 parts of phenol (softening point 40° C. KS) are melted with 60 parts of coal tar pitch (softening point 69° C.) and 40 parts of bitumen in an open vessel and thoroughly mixed with a stirrer. To the resulting mixture 12 parts of hexamethylenetetramine and 2 parts of solid NaOH are added at about 100° C. The mixture thus prepared is further heated to about 140° C. under continued stirring. Due to exothermic reaction the temperature increases to about 160° C. After fading of the exothermic reaction, heating is continued to 180° C. and at this temperature the mixture is foamed by incorporation of 6% hexamethylenetetramine in a pressure vessel. (Softening point of the mixture 73° C. KS.)

The resulting foam material has a bulk weight of 200 kg./m.$^3$. Its structure shows fine and uniform pore-formation.

EXAMPLE 3

70 parts of phenol (softening point 40° C. KS) are heated with 130 parts of lignite tar pitch (softening point 59° C. KS) to 100° C. and mixed with 15 parts of hexamethylene tetramine and 2.6 parts of solid NaOH. Heating to about 140° C. is continued with stirring. Due to exothermic reaction, the temperature rises to about 160° C. After fading of the exothermic reaction, the mixture is heated to 185° C. with continued stirring, allowed to cool to 170° C. and is foamed with 6% of hexamethylenetetramine in a pressure vessel.

The pitch foam thus obtained has a bulk weight of 185 kg./m.$^3$ and a medium-fine, uniform pore-structure.

EXAMPLE 4

60 parts of phenol (softening point 40° C. KS) are introduced together with 36 parts of coal tar pitch (softening point 70° C. KS) into a closed heatable receptacle provided with a stirrer. At about 100° C. 7.8 parts of hexamethylenetetramine and 1.2 parts of solid NaOH are added and the mixture is heated by means of a steam heating coil located in the receptacle to about 140° C. After the start of the exothermic reaction heating is stopped and after fading of the reaction started again at about 168° C. After 1¾ hours a temperature of 193° C. is attained. This temperature is maintained until a total condensation period of 3 hours and 50 minutes is attained. (Softening point of the pitch-phenolic resin-mixture: 53.5° C. KS.) The condensate thus obtained is discharged into a vessel and united with 54 parts, i.e., the residual portion of the pitch. This portion of the pitch may be either added in cold condition, or—if it better corresponds to the working conditions—with a temperature of, for example, 300° C.

Subsequently, foaming is brought about at 168° C. with 5% of hexamethylenetetramine, in a pressure vessel.

The pitch foam thus obtained has the following characteristics:

Bulk weight _____ 200 kg./m.³
Resistance to pressure _____ 28.5 kg./cm.²
Pores _____ Fine and uniform.
Resistance to abrasion _____ Good.

EXAMPLE 5

60 parts of phenol (softening point 40° C. KS) are introduced together with 18 parts of coal tar pitch (softening point: 67° C. KS) into a closed, heatable receptacle provided with a stirring device. At about 100° C. 7.8 parts of hexamethylenetetramine and 1.2 parts of solid NaOH are added and the mixture is heated to 143° C. by means of a steamheating coil located in the receptacle. At the start of the exothermic reaction heating is stopped and started again after termination of the reaction at 175° C., and continued until after a total period of condensation of 4 hours a final temperature of 187° C. is attained. (Softening point of the pitch-phenolic resin-mixture: 47.5° C. KS.)

The resulting condensate is discharged and unified with the residual portion of pitch (72 parts).

Foaming of the pitch-phenolic resin-mixture is carried out exactly in the same manner as in Example 4, and the characteristics of the pitch foam corresponding to those of the pitch foam obtained in Example 4.

EXAMPLE 6

To 80 parts commercial mixture of phenol, o-cresol, m-/p-cresol and xylenols and 48 parts of coal tar pitch (softening point 70° C. KS) with intensive stirring at about 100° C., 9.6 parts of hexamethylenetetramine and 1.6 parts of solid NaOH are added. The mixture is heated to 140° C. with continued stirring. The exothermic reaction starting at this temperature raises the temperature to about 165° C. After fading of the exothermic reaction heating up to 190° C. is continued and this temperature is maintained for 10 minutes. The condensate thus obtained is subsequently united with a residual amount of 72 parts of pitch. (Softening point of the pitch-phenolic resin-mixture: 83.5° C. KS.) Subsequently, the mass is allowed to cool to 165° C. and foamed with 6% hexamethylenetetramine in a pressure vessel.

The pitch foam obtained has a bulk weight of 180 kg./m.³ and a fine, uniform structure.

The word "phenol" is used herein to denote carbolic acid ($C_6H_5OH$) of pure or technical quality. The term "bitumen 95/15" is used in the above Example 2 to denote a bitumen with softening point 95° C. and penetration 15. The percent-amount of hexamethylenetetramine used in the above examples for foaming and hardening the condensate is 4 to 7%, preferably 5–6% by weight calculated on the weight of the resulting mixtures of bituminous masses with phenol-formaldehyde resins.

What is claimed is:

1. Process for preparing foam materials which are resistant to pressure and heat, from mixtures of bituminous masses and phenolic resins, comprising subjecting mixtures of bituminous masses with phenols and hexamethylenetetramine in the presence of an alkaline catalyst to a condensation reaction at temperatures in the range of 140 to 200° C. for about 4 hours, and foaming and hardening the resulting mixtures of bituminous masses with phenol-formaldehyde resins by the addition of hexamethylenetetramine.

2. A process as claimed in claim 1, in which the condensation reaction is first carried out in the presence of a fraction only of the bituminous mass, subsequently adding the residual portion of the bituminous mass to the reaction mass and foaming and hardening the resulting mixture.

3. A process as claimed in claim 2, in which said first fraction of the bituminous mass amounts to 25 to 65% calculated on the weight of the phenols used.

4. A process as claimed in claim 1, in which foaming and hardening is carried out at temperatures in the range of 165 to 180° C.

5. A process as claimed in claim 1, in which the bituminous masses are selected from the group consisting of natural asphalt, petroleum bitumen, coal tar, lignite tar, wood tar and petroleum bitumen rich in aromatics and used in an amount of 50 to 70% calculated on the weight of the mixture of the bituminous mass with phenols.

6. A process as claimed in claim 1, in which pitches having softening points according to Kramer-Sarnow in the range of 30 to 120° C. are used.

7. A process as claimed in claim 1, in which the phenols are selected from the group consisting of phenol ($C_6H_5OH$) cresols and xylenols.

References Cited

UNITED STATES PATENTS

| | | | |
|---|---|---|---|
| 3,207,687 | 9/1965 | Maier | 260—28 |
| 2,168,981 | 8/1939 | Flood et al. | 260—2.5 F |
| 3,239,487 | 3/1966 | Dijkstra | 260—2.5 F |

FOREIGN PATENTS

| | | | |
|---|---|---|---|
| 867,705 | 11/1941 | France | 260—2.5 F |
| 1,065,257 | 5/1954 | France | 260—2.5 F |

SAMUEL H. BLECH, Primary Examiner

M. FOELAK, Assistant Examiner

U.S. Cl. X.R.

260—28